US006836391B2

(12) United States Patent
Kanda

(10) Patent No.: US 6,836,391 B2
(45) Date of Patent: Dec. 28, 2004

(54) MAGNETIC HEAD SLIDER AND MAGNETIC HEAD ASSEMBLY WITH SHORT-CIRCUITING SWITCHING ELEMENT

(75) Inventor: Eiichi Kanda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 10/058,172

(22) Filed: Oct. 29, 2001

(65) Prior Publication Data

US 2002/0060888 A1 May 23, 2002

Related U.S. Application Data

(63) Continuation of application No. PCT/JP99/03311, filed on Jun. 22, 1999.

(51) Int. Cl.[7] ............................................... G11B 5/127
(52) U.S. Cl. ........................................................ 360/323
(58) Field of Search ................................ 360/323, 110, 360/234.5, 245.8, 234.4; 369/112.11

(56) References Cited

U.S. PATENT DOCUMENTS

| | | | | |
|---|---|---|---|---|
| 5,712,747 A | * | 1/1998 | Voldman et al. | ......... 360/234.4 |
| 5,715,226 A | * | 2/1998 | Shimano et al. | ......... 369/13.32 |
| 5,757,591 A | * | 5/1998 | Carr et al. | ................... 360/323 |
| 5,812,349 A | * | 9/1998 | Shouji et al. | ............. 360/245.8 |
| 6,381,171 B1 | * | 4/2002 | Inomata et al. | ............. 365/173 |
| 6,400,534 B1 | * | 6/2002 | Klaassen | .................... 360/323 |
| 6,415,500 B1 | * | 7/2002 | Han et al. | ................. 29/603.14 |
| 6,436,526 B1 | * | 8/2002 | Odagawa et al. | ........... 428/332 |

FOREIGN PATENT DOCUMENTS

| | | |
|---|---|---|
| JP | 03-057705 | 3/1991 |
| JP | 07-085422 | 3/1995 |
| JP | 07-141636 | 6/1995 |
| JP | 07-169005 | 7/1995 |
| JP | 08-221721 | 8/1996 |
| JP | 08-315321 | 11/1996 |
| JP | 09-091623 | 4/1997 |
| JP | 09-161238 | 6/1997 |
| JP | 09-223304 | 8/1997 |
| JP | 09-288805 | 11/1997 |
| JP | 10-269534 | 10/1998 |

* cited by examiner

*Primary Examiner*—Brian E. Miller
(74) *Attorney, Agent, or Firm*—Greer, Burns & Crain, Ltd.

(57) ABSTRACT

A magnetic head slider of the present invention includes a slider body having an air bearing surface opposed to a magnetic disk, a magnetic head including a magneto-resistance effect element provided on the slider body, first and second terminals connected to the MR element, and a switching element for short-circuiting the first and second terminals in response to an external input. With this configuration, it is possible to prevent the occurrence of damages of the MR element due to static electricity or the like. A photo-transistor is suitable as the switching element in consideration of productivity of a magnetic disk drive unit. In this case, the external input is light incident on the photo-transistor, and when the magnetic head slider is housed in a disk enclosure and is thereby shielded from light, the photo-transistor is turned off to allow a sensing current to flow in the MR element.

2 Claims, 9 Drawing Sheets

MAGNETIC HEAD SLIDER AND MAGNETIC HEAD ASSEMBLY WITH SHORT-CIRCUITING SWITCHING ELEMENT

This application is a continuation of PCT/JP99/03311 filed Jun. 22, 1999.

BACKGROUND OF THE INVENTION

1. Field of the Invention

The present invention relates to an improved magnetic disk drive unit having a magnetic head provided accessibly to a recording region of a rotating magnetic disk, and particularly to a magnetic head slider, a magnetic head assembly, and a magnetic disk drive unit, each of which includes a magneto-resistance effect element for readout.

2. Description of the Related Art

In recent years, along with a tendency toward smaller sizes and larger capacities of magnetic disk drive units used for external storages of computers, flying heights of head sliders have come to be reduced, and it has been required to realize contact recording/reproducing performed with a slider being separated from a recording medium by a significantly small flying height or being in contact with a recording medium. On the other hand, related art magnetic induction heads have an inconvenience that as a peripheral velocity of the head (velocity of the head relative to that of a medium) is reduced depending on reductions in sizes of magnetic disks as media, a reproducing output of the head is degraded. To cope with such an inconvenience, it has been required to develop a composite head slider having an electromagnetic transducer which includes a magneto-resistance effect element (MR element) capable of obtaining a large reproducing output not depending on a peripheral velocity, more specifically, even at a low peripheral velocity in combination with a coil for writing data.

In composite head sliders, at the time of writing data, a current modulated in response to data is made to flow in a coil, to thereby magnetically record information on a magnetic disk as a medium. At the time of reading out information recorded on a medium, a constant sensing current is supplied to an MR element, to convert a change in magnitude of a signal magnetic field leaked from a recording track of the medium into a change in resistance, whereby information recorded on the medium is reproduced as a change in voltage value.

A composite head slider has an electromagnetic transducer including an MR element generally formed on a slider body by a thin film process or the like and a coil for writing data, and is mounted on a leading end portion of a suspension made from a stainless steel by adhesive bonding or the like.

Lead wires for connecting an MR element and a coil to a recording/reproducing circuit of a magnetic disk drive unit are formed by copper patterns printed on a suspension. By mounting the suspension to a leading end portion of an actuator arm, the MR element and coil are connected to the recording/reproducing circuit via a flexible printed circuit board (FPC) or the like.

In related art composite head sliders, a pair of terminals connected to an MR element are in an electrically opened state. Accordingly, when an operator charged with static electricity handles such a composite head slider having an MR element or carries the composite head slider in a state that the slider is housed in a case made from a synthetic resin or the like liable to charged, an overcurrent due to electrostatic charge flows in the MR element, thereby causing a problem associated with burning of the MR element or the like.

A related art magnetic head slider including a composite head slider mounted on a suspension causes the same problem as that described above. That is to say, in the related art magnetic head assembly, a pair of lead wires (or wiring patterns), which are formed on a suspension in such a manner that one-ends thereof are connected to an MR element, are in an electrically opened state.

Accordingly, when an operator charged with static electricity handles such a magnetic head assembly, an overcurrent due to electrostatic charge flows in the MR element, tending to cause burning of the MR element.

SUMMARY OF THE INVENTION

Accordingly, an object of the present invention is to provide a magnetic head slider capable of preventing the occurrence of burning of an MR element due to static electricity.

Another object of the present invention is to provide a magnetic head assembly capable of preventing the occurrence of burning of an MR element due to static electricity.

A further object of the present invention is to provide a magnetic disk drive unit easily assembled by using a magnetic head provided by such a magnetic head slider or magnetic head assembly.

The other objects of the present invention will be apparent from the following description.

According to a first aspect of the present invention, there is provided a magnetic head slider including a slider body having an air bearing surface opposed to a magnetic disk, an MR element provided on the slider body, and first and second terminals connected to the MR element. This magnetic head slider is characterized by a switching element for short-circuiting the first and second terminals in response-to an external input.

With this configuration, since the switching element for short-circuiting the first and second terminals in response to an external input is adopted, at the time of carrying the magnetic head slider or assembling a magnetic head assembly or a magnetic disk drive unit using the magnetic head slider, the flow of an overcurrent due to electrostatic charge or the like in the MR element can be prevented by short-circuiting the first and second terminals by the switching element, and at the time of operating the magnetic head slider, a sensing current is made to flow in the MR element by releasing the short-circuit between the first and second terminals in response to the external input. With this first aspect of the present invention, it is possible to provide the magnetic head slider capable of preventing the occurrence of damages of the MR element due to static electricity.

Preferably, the switching element includes a phototransistor provided on the slider body in such a manner as to connect the first and second terminals to each other. In this case, light incident on the photo-transistor can be used as the external input. Accordingly, when a magnetic disk drive unit is assembled such that the magnetic head slider is enclosed in an opaque disk enclosure, the short-circuit between the first and second terminals and the release thereof by the switching element can be automatically performed. In this way, the magnetic disk drive unit can be easily produced.

According to a second aspect of the present invention, there is provided a magnetic head assembly including a slider body having an air bearing surface opposed to a magnetic disk, an MR element provided on the slider body, and a suspension on which the slider body is mounted and which has first and second wiring patterns connected to the MR element. This magnetic head assembly is characterized by a switching element for short-circuiting the first and second wiring patterns in response to an external input.

With this configuration, like the first aspect of the present invention, it is possible to provide the magnetic head assembly capable of preventing the occurrence of damages of the MR element due to static electricity.

Preferably, the switching element includes a photo-transistor which is provided on the suspension in such a manner as to connect the first and second wiring patterns to each other. In this case, light incident on the photo-transistor can be used as the external input. Accordingly, like the above described case, a magnetic disk drive unit can be easily produced.

According to a third aspect of the present invention, there is provided a magnetic head slider characterized by a switching element for turning on/off connection between at least one of first and second terminals and an MR element in response to an external input.

For example, at the time of carrying the magnetic head slider or assembling a magnetic head assembly or a magnetic disk drive unit using the magnetic head slider, the above connection is turned off by the switching element, and at the time of operating the magnetic head slider, the above connection is turned on by the switching element. As a result, it is possible to provide the magnetic head slider capable of preventing the occurrence of damages of the MR element due to static electricity.

Preferably, the magnetic head slider further includes a third terminal for receiving an external input, and the switching element includes a transistor connected to the third terminal on the slider body. This magnetic head slider is convenient because at the time of carrying the magnetic head slider or the like, any external energy is not required to turn off the above connection by using the switching element. At the time of operating the MR element, since the magnetic head assembly or the-magnetic disk drive, unit having the magnetic head slider has been already assembled, an electrical signal can be easily supplied as an external input to the switching element via the third terminal.

Preferably, to perform discharge between the first and second terminals at all times, a resistance having a resistance value larger than a resistance value of the MR element is connected between the first and second terminals. The reason why the resistance value of the resistance is larger than that of the MR element is to make a large amount of a sensing current flow in the MR element for operating the MR element, thereby enhancing a sensitivity of sensing. Accordingly, the resistance having a resistance value being as large as ten times the resistance value of the MR element is preferably provided between the first and second terminals.

According to a fourth aspect of the present invention, to obtain the same effect as that obtained by the third aspect of the present invention, there is provided a magnetic head assembly characterized by a switching element for turning on/off connection between at least one of first and second wiring patterns and an MR element in response to an external input.

According to a fifth aspect of the present invention, there is provided a magnetic disk drive unit including a disk enclosure, a magnetic disk provided rotatably in the disk enclosure, and a magnetic head provided accessibly to a recording region of the magnetic disk. The magnetic head is configured as the magnetic head slider of the present invention or the magnetic head assembly of the present invention.

With this configuration, since the occurrence of damages, due to static electricity, of the MR element in the magnetic head slider or magnetic head assembly is prevented in accordance with the present invention, it is possible to easily produce a magnetic disk drive unit.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
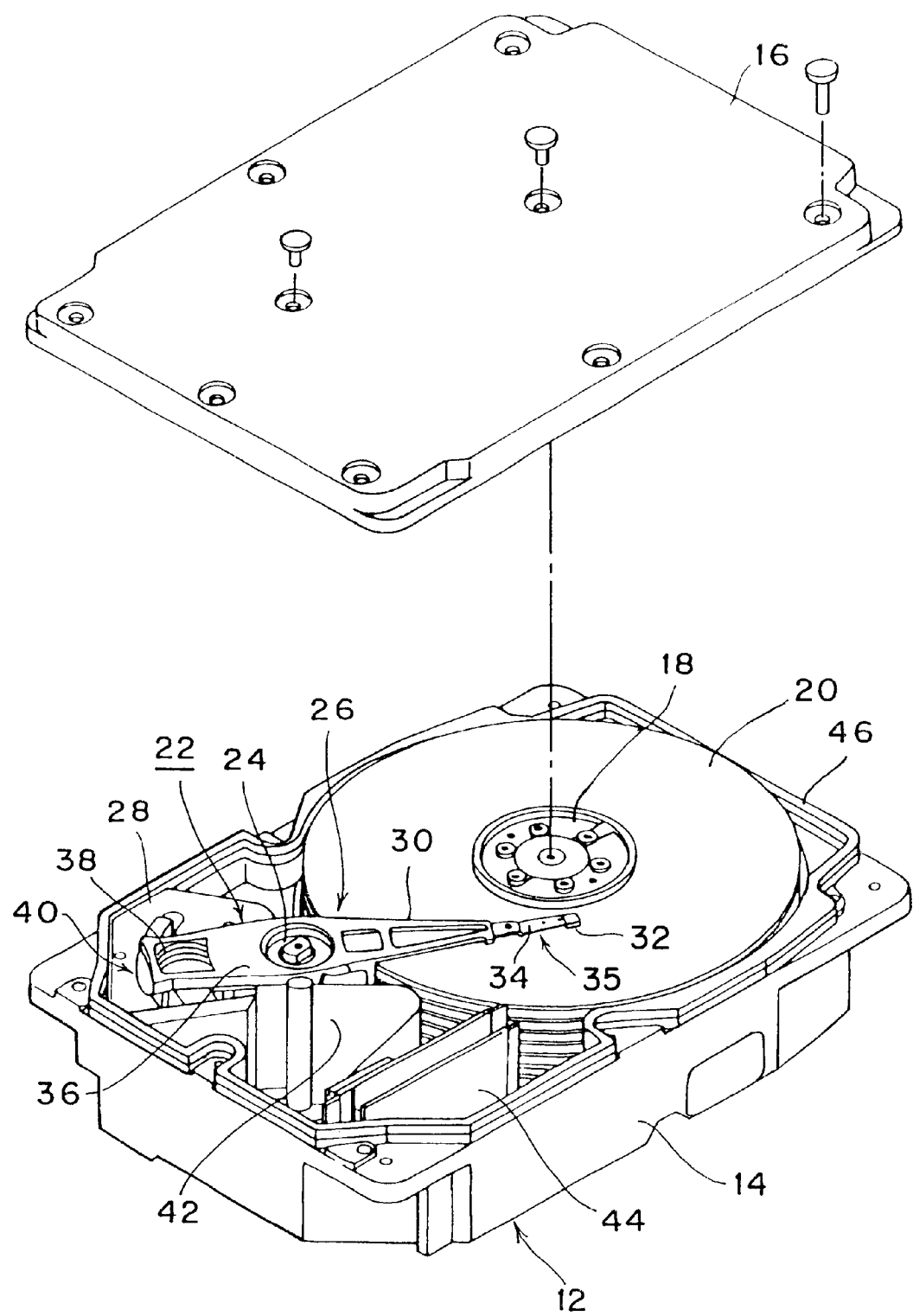
FIG. 1 is an exploded view in perspective of a magnetic disk drive unit of the present invention.

Hereinafter, preferred embodiments of the present invention will,be described in detail with reference to the accompanying drawings. In all the, drawings, substantially the same parts are designated by the same reference numerals.

FIG. 1 is an exploded view in perspective of a magnetic disk drive unit (magnetic disk drive) of the present invention. Reference numeral 12 designates a housing (disk enclosure) composed of a base 14 and a cover 16. A spindle hub (not shown) rotated by an inner hub motor is provided on the base 14. A plurality of magnetic disks 20 are mounted on the spindle hub while being spaced from each other at specific intervals by alternately inserting the magnetic disks 20 and spacers (not shown) and screwing a disk clamp 18 to the spindle hub.

Reference numeral 22 designates a rotary actuator composed of an actuator arm assembly 26 and a magnetic circuit unit 28. The actuator arm assembly 26 is mounted rotatably around a shaft 24 fixed to the base 14. The actuator arm assembly 26 includes a plurality of actuator arms 30 extending in one direction from the rotational center of the actuator arm assembly 26 and coil supporting members 36 extending in the direction opposed to the extending direction of the actuator arms 30.

A magnetic head assembly 35 is fixed to a leading end portion of each actuator arm 30. The head assembly 35 is composed of a magnetic head slider 32 and a suspension 34 which mounts, on its leading end, the head slider 32 is mounted.

A coil 38 is supported by the coil supporting member 36. A magnetic circuit unit 28 and the coil 38 inserted in a gap formed in the magnetic circuit unit 28 constitute a voice coil motor (VCM) 40. Accordingly, the magnetic head slider 32 becomes accessible to a recording region of the magnetic disk 20 by driving the VCM 40.

Reference numeral 42 designates a flexible printed circuit board (FPC) for connecting the head slider 32 to a circuit board (not shown) having an initial stage readout circuit or the like. One end of the FPC 42 is fixed by a fixing member 44, and the other end thereof is electrically connected to the actuator assembly 26 by a connector (not shown).

An annular packing assembly 46 is mounted on the base 14. The interior of the housing 12 is sealed by screwing the cover 16 to the base 14 with the packing assembly 46 put therebetween. In particular, according to this embodiment, to adapt the magnetic disk drive unit to a specific form of the present invention, each of the base 14 and the cover 16 is made from an opaque material such as a metal for preventing entrance of external light in the housing 12 after assembly of the magnetic disk drive unit.

Figure 2:
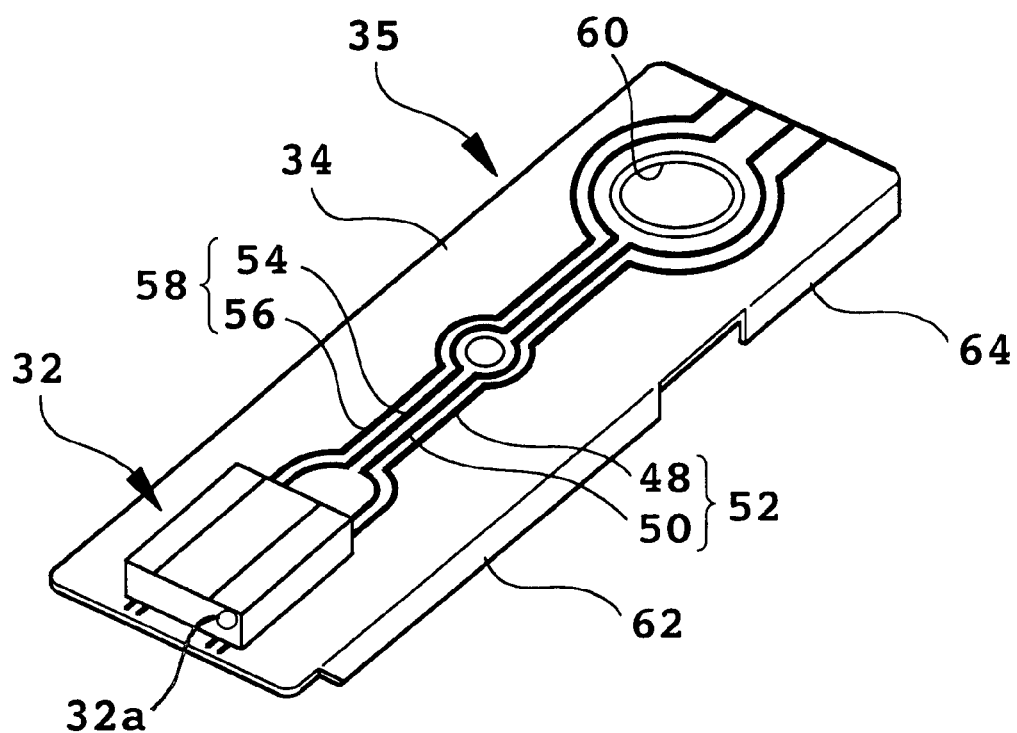
FIG. 2 is a perspective view of a magnetic head assembly shown in FIG. 1.
Figure 3:
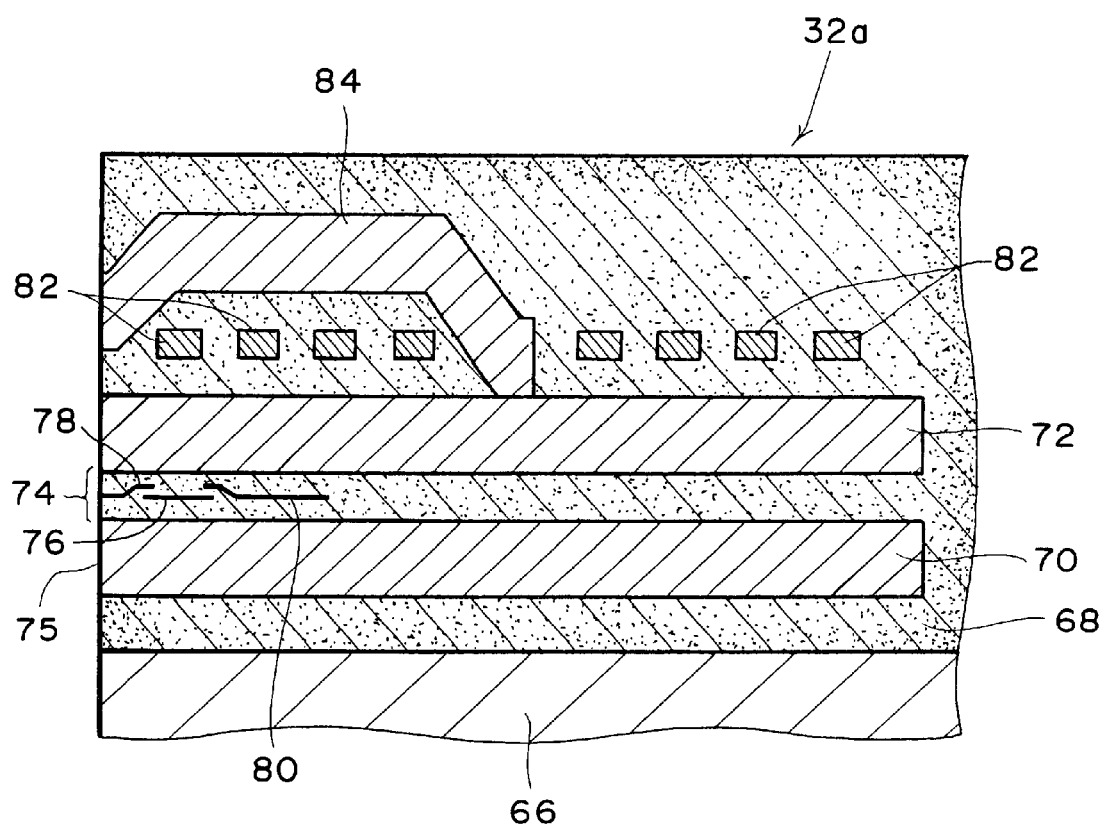
FIG. 3 is a sectional view of an electromagnetic transducer shown in FIG. 2 (partial sectional view of a magnetic head slider)

FIG. 2 is a perspective view of the magnetic head assembly 35 shown in FIG. 1. In this figure, there is shown a state that the magnetic head assembly 35 is viewed from the corresponding magnetic disk 20 side. The suspension 34 is formed of an elastic body made from a stainless steel or the like. The magnetic head slider 32 having an electromagnetic transducer (magnetic head or composite head) 32a fully shown in FIG. 3 is mounted on a leading end portion of the suspension 34. A hole 60 for mounting the magnetic head assembly 35 to the actuator arm 30 (see FIG. 1) is provided in a base end portion of the suspension 34. A pair of ribs 62 (only one is shown in the figure) for ensuring a rigidity of the suspension 34 are formed on both side portions of the suspension 34 in such a manner as to be integrated with the suspension 34. A spacer 64 is fixed to the base end portion of the suspension 34 by adhesive bonding or the like.

To electrically connect the electromagnetic transducer 32a to the external circuit such as the initial stage readout circuit, a coil wiring pattern 52 composed of conductive patterns (lead wires) 48 and 50 extending from the leading end portion to the base end portion of the suspension 34 and an MR wiring pattern 58 composed of similar conductive patterns (lead wires) 54 and 56 are formed on the suspension 34 by printing of copper or the like.

As shown in FIG. 3, the electromagnetic transducer 32a has a conductive substrate 66, and a non-magnetic insulating layer 68 which is typically made from alumina ($Al_2O_3$) and stacked on the conductive substrate 66. A first magnetic shield 70 and a second magnetic shield 72, each of which is typically made from nickel-iron (Ni—Fe), are buried in the non-magnetic insulating layer 68. The first and second magnetic shields 70 and 72 define, at a leading end surface (surface opposed to a medium) 75 of the transducer 32a, a gap 74 for improving a reproducing resolution.

A magneto-resistance effect element (MR element), typically made from nickel-iron (Ni—Fe), is buried in the non-magnetic insulating layer 68 at a position spaced from the leading end surface 75 of the transducer 32a. A front flux guide 78, typically made from nickel-iron (Ni—Fe), is also buried in the non-magnetic insulating layer 68 in a state that one end of the front flux guide 78 is exposed to the outside from the leading end surface 75 of the transducer 32a and the other end thereof is magnetically coupled to one end of the magneto-resistance effect element 76. The front flux guide 78 guides a magnetic flux from a recording medium (magnetic disk) 20 to the magneto-resistance effect element 76. Reference numeral 80 designates a rear flux guide which is typically made from nickel-iron (Ni—Fe) like the front flux guide 78. One end of the rear flux guide 80 is magnetically coupled to the magneto-resistance effect element 76.

While not shown, a sensing current source is connected to both ends, in the direction perpendicular to a paper plane, of the magneto-resistance effect element 76, and a constant sensing current is supplied from the sensing current source to the magneto-resistance effect element 76.

Reference numeral 84 designates a magnetic pole having one end exposed to the outside from the leading end surface 75 of the transducer 32a and the other end coupled to the second magnetic shied 72. A conductive coil 82 is wound substantially around a coupled portion between the magnetic pole 84 and the second magnetic shield 72. When a current modulated with information to be recorded is supplied to the coil 82, a magnetic field corresponding to the current value is induced,.whereby the information can be magnetically recorded on a recording track of the magnetic disk 20.

The magneto-resistance effect element 76 is used to read out information which has been recorded on the magnetic disk 20. To be more specific, a signal magnetic flux from a recording track of the magnetic disk 20 is received in the transducer 32a, and flows in the magneto-resistance effect element 76 while being guided by the front flux guide 78, to magnetize the magneto-resistance effect element 76. The magnetic flux having passed through the magneto-resistance effect element 76 is absorbed in the first and second magnetic shields 70 and 72 via the rear flux guide 80.

A resistance value of the magneto-resistance effect element 76 is changed in response to a change in magnitude of a signal magnetic flux. Since a constant sensing current is supplied from the sensing current source to the magneto-resistance effect element 76, a voltage across the magneto-resistance effect element 76 is changed in response to the change in resistance value of the magneto-resistance effect element 76, to thereby reproduce information recorded in the magnetic disk 20 as a voltage signal.

Figure 4:
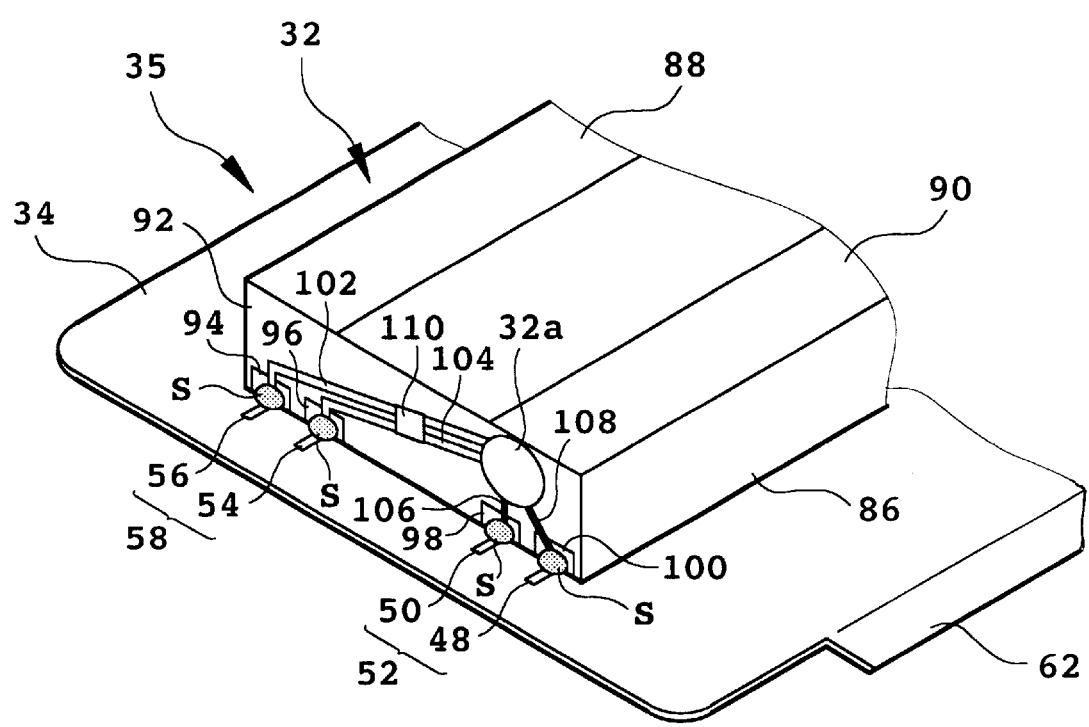
FIG. 4 is a partial perspective view showing a first embodiment of a magnetic head slider of the present invention.

FIG. 4 is a partial perspective view showing a first embodiment of the magnetic head slider of the present invention. More specifically, this figure shows details of a portion, on which the magnetic head slider 32 is mounted, of the magnetic head assembly 35 shown in FIG. 2, and its neighborhood.

The magnetic head slider 32 has a slider body 86 on which the transducer 32a is integrally formed. The slider body 86 has a pair of rails 88 and 90 spaced from each other. The rails 88 and 90 provide an air bearing surface which is opposed to the rotating magnetic disk 20 (see FIG. 1) for generating a flying force. The transducer 32a is provided on an end surface 92, on the air flow-out side associated with the air bearing, of the slider body 86.

Terminals 94 and 96 for the MR element 76 (see FIG. 3) of the transducer 32a and terminals 98 and 100 for the coil 82 of the transducer 32a are formed on the end surface 92. The terminals 94 and 96 are electrically connected to both ends of the MR element 76 of the transducer 32a via electrodes 102 and 104, respectively, and the terminals 98 and 100 are electrically connected to both ends of the coil 82 of the transducer 32a via electrodes 106 and 108, respectively. The terminals 94 and 96 are connected to conductive patterns 56 and 54 of an MR wiring pattern 86 by soldering, respectively, and the terminals 98 and 100 are connected to conductive patterns 50 and 48 of a coil wiring pattern 52 by soldering, respectively. In the figure, each solderd portion is designated by alphabetical character S.

This embodiment is characterized by a photo-transistor 110 provided on the slider body 86 so as to connect the terminals 94 and 96 to each other. Here, the photo-transistor 110 is provided on the end surface 92 of the slider body 86 so as to connect the electrodes 102 and 104 to each other. When light is left as being incident as an external input on the photo-transistor 110, a resistance between a collector and an emitter of the photo-transistor 110 is sufficiently small, and when the incidence of light as the external input on the photo-transistor 110 is interrupted, the resistance between the collector and emitter of the photo-transistor 110 becomes sufficiently large.

Accordingly, when the magnetic head slider 32 is handled at a bright location before being mounted to the suspension 34, a current generated due to static electricity or the like flows in the photo-transistor 110 rather than flows in the MR element 76 of the transducer 32a (see FIG. 3), to thereby prevent the occurrence of damages of the MR element 76 due to the current. On the basis of the same principle, even after the magnetic head assembly 35 is assembled by mounting the magnetic head slider 32 on the suspension 34, it is possible to prevent the occurrence of damages of the MR element 76 insofar as the assembly 35 is handled at a bright location.

After assembly of the magnetic disk drive unit shown in FIG. 1 is ended by housing the magnetic head slider 32 or the magnetic head assembly 35 in the disk enclosure 12, light as the external input does not enter the disk enclosure 12, so that the resistance between the collector and emitter of the photo-transistor 110 becomes sufficiently large. Accordingly, like the case with no photo-transistor 110, the transducer 32a can be operated by making a sensing current flow in the MR element 76 via the MR wiring pattern 58 and the terminals 94 and 96. As a result, the magnetic disk drive unit can be easily produced by using the magnetic head slider 32 or the magnetic head assembly 35 shown in FIG. 4 without consideration of damages of the MR element 76 due to static electricity or the like.

The photo-transistor 110 of the magnetic head slider 32 shown in FIG. 4 may be obtained by mounting a photo-transistor chip on a magnetic head slider provided in accordance with a related art or may be produced in a process of producing the transducer 32a or the like on the end surface 92 of the slider body 86.

Figure 5:
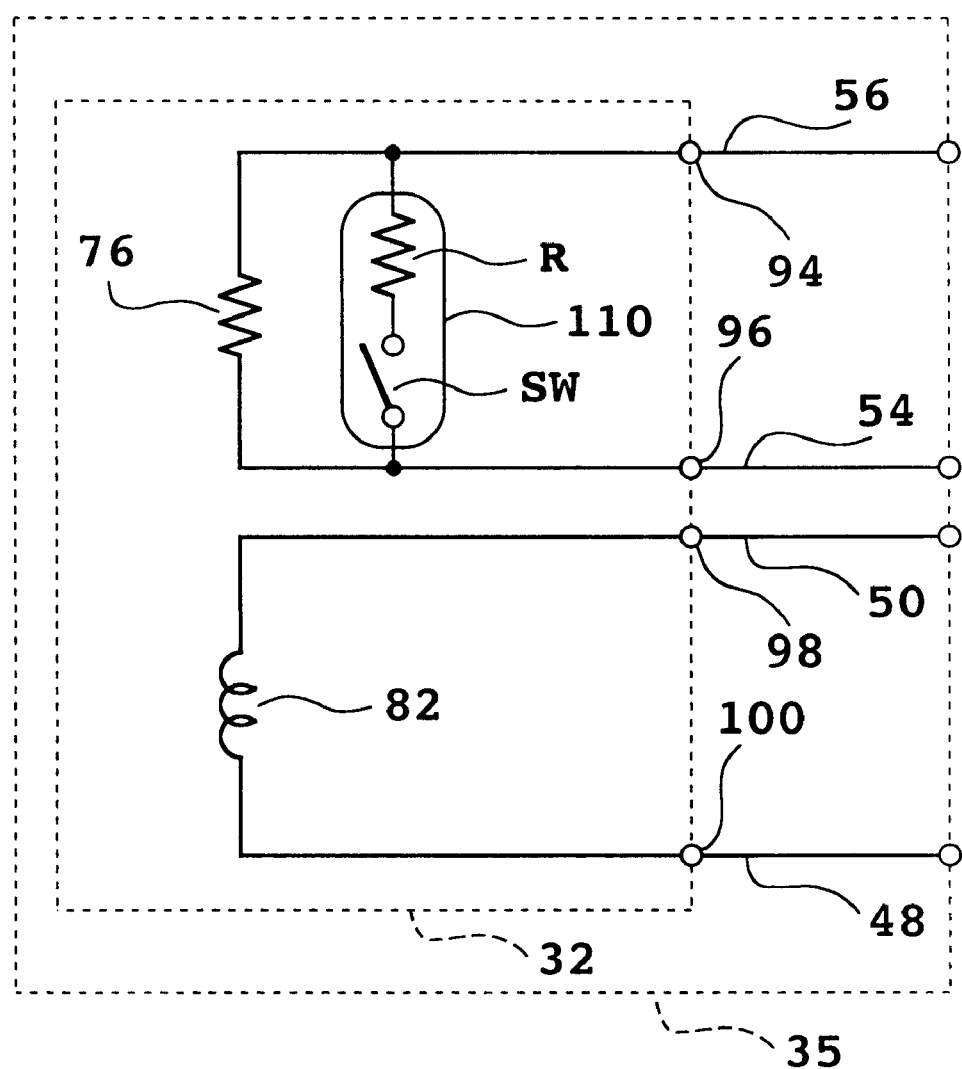
FIG. 5 is an equivalent circuit diagram of the magnetic head slider shown in FIG. 4.

FIG. 5 is an equivalent circuit diagram of the magnetic head slider 32 (magnetic head assembly 35) shown in FIG. 4. The photo-transistor 110 as a switching element for short-circuiting the terminals 94 and 96 in response to an external input is connected in parallel to the MR element 76. The switching element functionally includes a switch SW turned on/off in response to an external input and an internal resistance R connected in series to the switch SW. Accordingly, another transistor or any other semiconductor device can be used in place of the photo-transistor 110 insofar as it provides such a function. If the internal resistance R of the photo-transistor 110 is excessively large to short-circuit the terminals 94 and 96, the switching element can be configured by connecting a plurality of photo-transistors in parallel between the terminals 94 and 96. If the internal resistance R of the photo-transistor 110 is excessively small and thereby a large current due to static electricity or the like may flow in the photo-transistor 110 to damage it, the switching element may be configured by connecting an external resistance (not shown) to the photo-transistor 110 or connecting a plurality of photo-transistors in series to each other.

The switching element, which can be variously modified as described above, may be connected between the conductor patterns 54 and 56 of the MR wiring pattern 58 (foe example, see FIG. 2). Such an arrangement of the switching element will be described with reference to FIG. 6.

Figure 6:
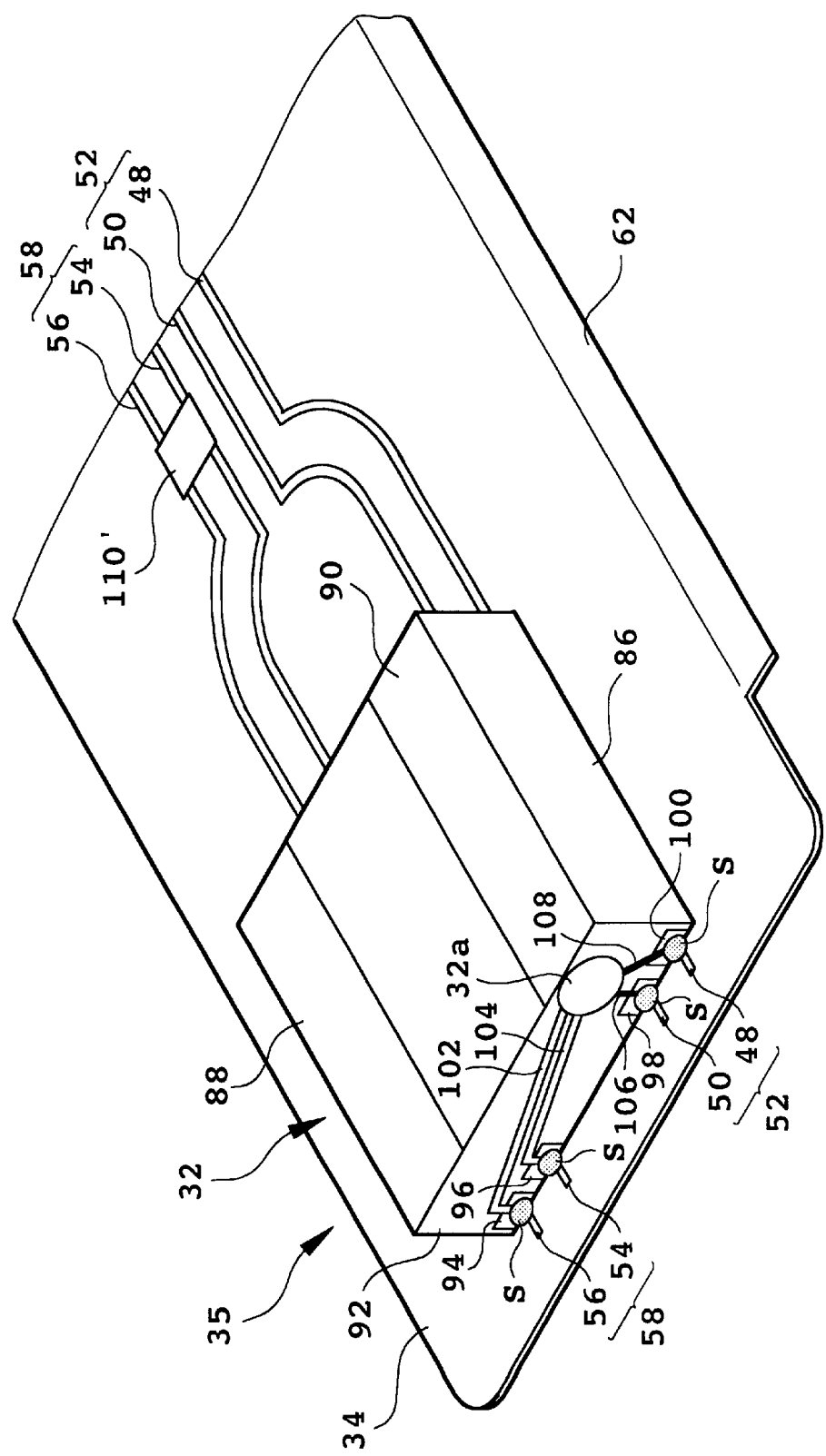
FIG. 6 is a partial perspective view showing a first embodiment of a magnetic head assembly of the present invention.

FIG. 6 is a partial perspective view showing a first embodiment of the magnetic head assembly of the present invention. Referring to this figure, a magnetic head slider 32, which is the same as that shown in FIG. 4 except that the photo-transistor 110 is omitted, is mounted on the suspension 34, and a photo-transistor 110' as an alternative to the photo-transistor 110 is provided on the suspension 34 so as to connect the conductive patterns 54 and 56 of the MR wiring pattern 58 to each other. The photo-transistor 110' can be provided by mounting, for example, a photo-transistor chip on a surface, on the head slider side, of the suspension 34.

Even in this embodiment, the photo-transistor 110' short-circuits the conductive patterns 54 and 56 by incidence of light as an external input, so that like the embodiment shown in FIG. 4, it is possible to prevent the occurrence of damages of the MR element 76 due to static electricity or the like. Further, a magnetic disk drive unit can be easily produced by using the magnetic head assembly 35 without consideration of damages of the MR element 76.

According to the embodiment shown in FIG. 4 or 6, since the photo-transistor 110 or 110' short-circuits the MR element 76 by incidence of light as an external input, it is possible to eliminate the need of provision of wiring patterns or terminals for supplying electrical signals as an external input, and hence to simplify the configuration of the magnetic head slider or the magnetic head assembly.

Figure 7:
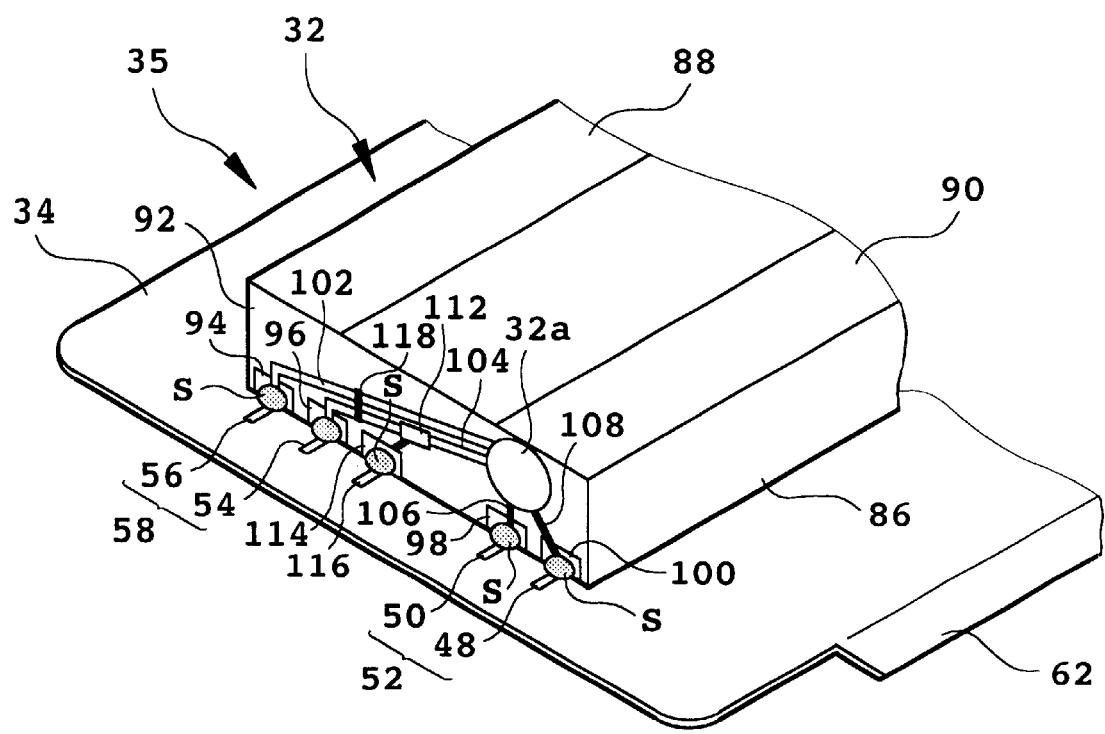
FIG. 7 is a partial perspective view showing a second embodiment of the magnetic head slider of the present invention.

FIG. 7 is a partial perspective view showing a second embodiment of the magnetic head slider of the present invention. According to this embodiment, to turn on/off connection between the terminal 96 and the MR element 76 of the transducer 32a in response to an external input, part of the electrode 104 is replaced with a resistance between a collector and an emitter of a transistor 112. A base of the transistor 112 is connected to a terminal 114 for receiving an external input. The terminal 114 is provided on the end surface 92 of the slider body 86 adjacently to the terminals 94, and 96. The terminal 114 is connected to a wiring pattern 116 for an external input formed on the suspension 34 by soldering. The wiring pattern 116 extends to the base end portion of the suspension 34 in parallel to the MR wiring pattern 58.

When the base of the transistor 112 does not receive any external input, the resistance between the collector and emitter of the transistor 112 is sufficiently large, to thereby prevent the flow of a current due to static electricity or the like in the MR element 76 via the terminals 94 and 96. As a result, it is possible to prevent the occurrence of damages of the MR element 76 due to static electricity or the like at the time of handing the magnetic head slider 32 or the magnetic head assembly 35.

In the case of operating the transducer 32a after housing the magnetic head slider 32 or the magnetic head assembly 35 in the disk enclosure 12, a conductive state between the terminal 96 and the MR element 76 can be obtained by applying an external input to the base of the transistor 112 via the wiring pattern 116 and the terminal 114, whereby a sensing current can be made to flow in the MR element 76. With respect to the external input, for example, the voltage source of the initial readout circuit can also serve as the external input, and accordingly, the circuit configuration can be free from complexity.

Even if the resistance between the collector and emitter of the transistor 112 is large and thereby the MR element 76 is in a state being cut off from the terminals 96, there is a possibility that charges due to static electricity or the like are stored in a capacitor formed in the magnetic head slider 32 and flow in the MR element 76 when the resistance between the collector and emitted of the transistor 112 becomes small, to damage the MR element 76. To cope with such an inconvenience, according to this embodiment, a resistance 118 for connecting the terminals 94 and 96 to each other is provided. To be more specific, the resistance 118 is provided on the end surface 92 of the slider body 86 in such a manner as to connect the electrode 102 to a portion, located between the terminal 96 and the transistor 112, of the electrode 104. A resistance value of the resistance 118 may be desirable to be larger than a resistance value of the MR element 76 for making a sensing current effectively flow in the MR element 76 in the operational state of the MR element 76. For example, the resistance value of the resistance 118 is set to be ten times or more the resistance value of the MR element 76. With this provision of the resistance 118, it is possible to prevent the charges stored in the above described capacitor from flowing in the MR element 76, and hence to prevent the occurrence of damages of the MR element 76.

Even in the embodiment shown in FIG. 7, the occurrence of damages of the MR element 76 due to static electricity or the like is prevented, so that like the above described embodiments, a magnetic disk drive unit can be easily produced.

The transistor 112 and the resistance 118 of the magnetic head slider 32 shown in FIG. 7 may be obtained by mounting a transistor chip and a resistance chip on a magnetic head slider provided in accordance with a related art, or may be produced in a process of producing the transducer 32a or the like on the end surface 92.

Figure 8:
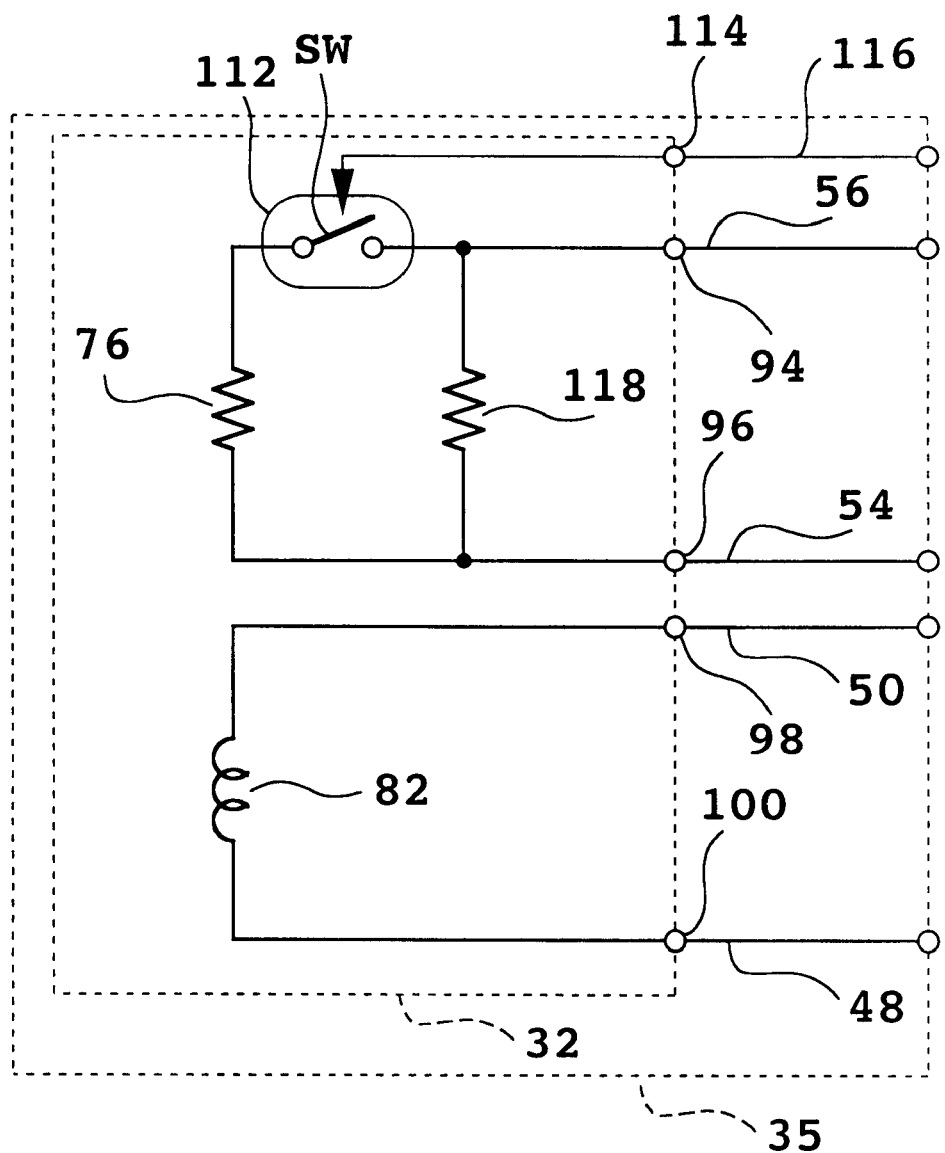
FIG. 8 is an equivalent circuit diagram of the magnetic head slider shown in FIG. 7.

FIG. 8 is an equivalent circuit diagram of the magnetic head slider 32 (magnetic head assembly 35) shown in FIG. 7. The transistor 112 as a switching element for turning on/off of connection between at least one of the terminals 94 and 96 and the MR element 76 in response to an external input is provided such that one of the collector and emitter is connected to the terminal 94 and the other is connected to one end of the MR element 76. The transistor 112 functionally includes a switch SW turned on/off in response to an external input supplied to the transistor 112 via the wiring pattern 116 and the terminal 114. Accordingly, a phototransistor or any other semiconductor device can be used in place of the transistor 112 insofar as it provides such a function. It is to be noted that an internal resistance of the transistor 112 is not shown in the figure.

According to this embodiment, the switching element is provided between the terminal 94 and the MR element 76; however, it may be provided between the terminal 96 and the MR element 76. Further, the switching elements may be provided between the terminal 94 and the MR element 76 and between the terminal 96 and the MR element 76.

The switching element may be provided at an intermediate portion of the conductive pattern 54 or 56 of the MR wiring pattern 58. This arrangement of the switching element will be described with reference to FIG. 9.

Figure 9:
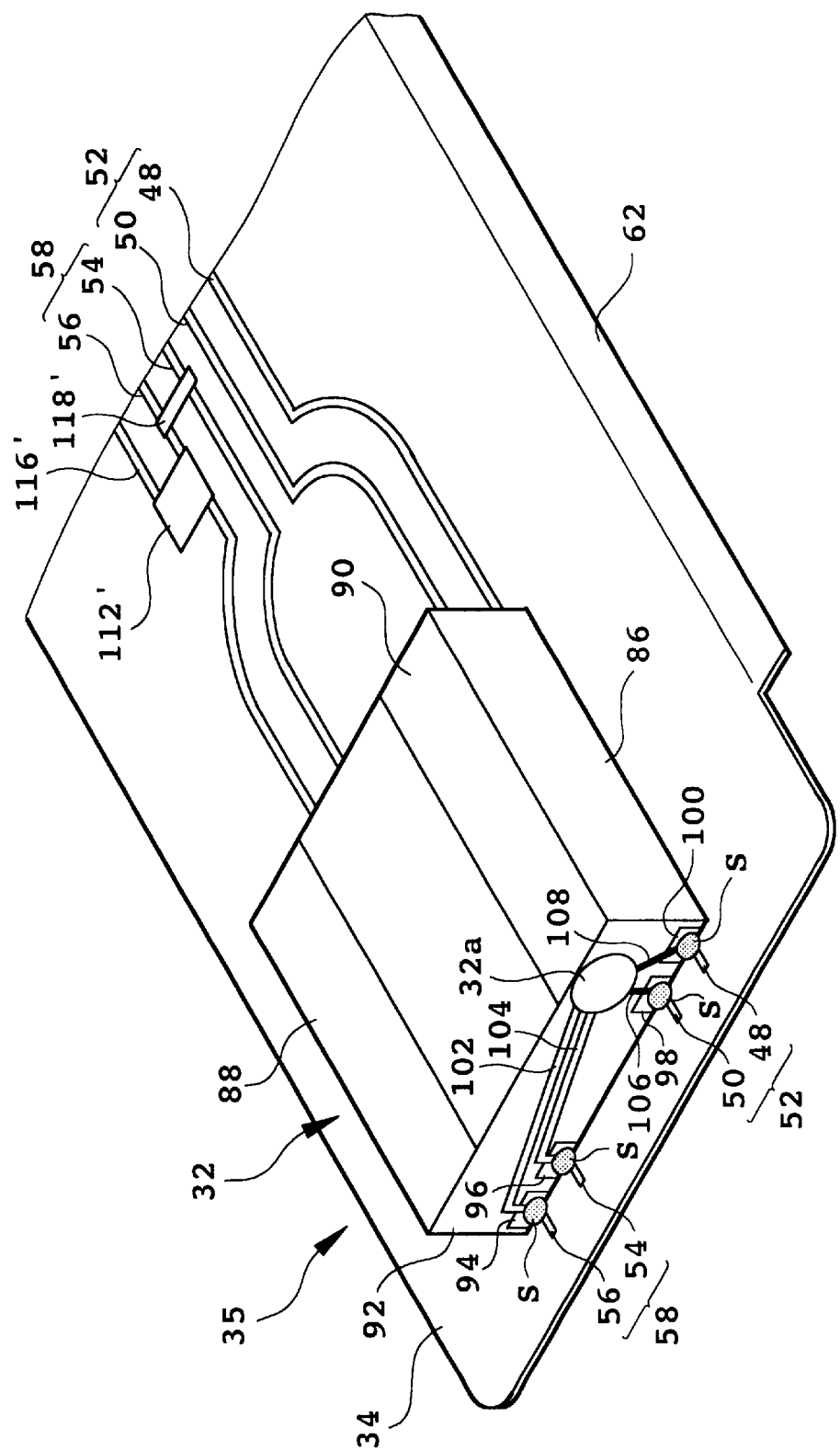
FIG. 9 is a partial perspective view showing a second embodiment of the magnetic head assembly of the present invention.

FIG. 9 is a partial perspective view showing a second embodiment of the magnetic head assembly of the present invention. According to this embodiment, like the embodiment shown in FIG. 6, a magnetic head slider 32 provided in accordance with a related art is mounted on the suspension 34. This embodiment is characterized in that part of the conductive pattern 56 of the MR wiring pattern 58 is replaced with a resistance between a collector and an emitter of a transistor 112'. A wiring pattern 116' for an external input is provided on the suspension 34 adjacently to the MR wiring pattern 58, and the wiring pattern 116' is connected to a base of the transistor 112'.

Even in this embodiment, when the resistance between the collector and emitter of the transistor 112' is sufficiently large, it is possible to prevent the occurrence of damages, due to static electricity or the like, of the MR element 76 of the magnetic head slider 32 mounted on the suspension 34. Further, after a magnetic disk drive unit is assembled by using the magnetic head assembly 35, a current can be made to flow in the MR element 76 by making the resistance between the collector and emitter of the transistor 112' small by an external input, with a result that the magnetic disk drive unit capable of performing such an operation can be easily produced.

In addition, according to this embodiment, a resistance 118', which corresponds to the resistance for bypassing shown in FIG. 7, is connected between the conductive patterns 54 and 56 of the MR wiring pattern 58. With this provision of the resistance 118', it is possible to prevent the storage of charges due to static electricity in relation to the MR element 76, and hence to prevent the occurrence of damages of the MR element 76 due to the stored charges.

The transistor 112' and the resistance 118' can be provided by mounting, for example, a transistor chip and a resistance chip on a surface, on the head slider side, of the suspension 34.

While the present invention has been described by way of the composite head slider having the transducer including the coil for writing and the MR element for reading, the present invention is not limited thereto but may be applied to a read only magnetic head slider having an MR element, a magnetic head assembly assembled by using the slider, or a magnetic disk drive unit assembled by using the assembly.

As described above, according to the present invention, it is possible to provide a magnetic head slider or a magnetic head assembly capable of preventing the occurrence of damages of a magneto-resistance effect element due to static electricity or the like. As a result, it is possible to easily produce a magnetic disk drive unit by using such a magnetic head slider or magnetic head assembly capable of preventing the occurrence of damages of the magneto-resistance effect element. The present invention, therefore, significantly contributes to development of the field of magnetic recording.

The present invention is not limited to the details of the above described preferred embodiments. The scope of the invention is defined by the appended claims and all changes and modifications as fall within the equivalents of the scope of the claims are therefore to be embraced by the invention.

What is claimed is:

1. A magnetic head slider comprising:
   a slider body having an air bearing surface opposed to a magnetic disk;
   a magneto-resistance effect element provided on said slider body;

first and second terminals connected to said magneto-resistance effect element; and a switching element for short-circuiting said first and second terminals in response to an external input, wherein said switching element comprises a photo-transistor which is provided to be able to connect said first and second terminals to each other; and wherein said external input is light incident on said photo-transistor.

2. A magnetic head assembly comprising:

a slider body having an air bearing surface opposed to a magnetic disk;

a magneto-resistance effect element provided on said slider body;

a suspension on which said slider body is mounted, said suspension having first and second wiring patterns connected to said magneto-resistance effect element; and a switching element for short-circuiting said first and second wiring patterns in response to an external input, wherein said switching element comprises a photo-transistor which is provided on said suspension to be able to connect said first and second wiring patterns to each other; and wherein said external input is light incident on said photo-transistor.

* * * * *